(12) United States Patent
Jordan (10) Patent No.: US 12,246,661 B1
(45) Date of Patent: Mar. 11, 2025

(54) VEHICLE-TRACKING WIRING HARNESS

(71) Applicant: Tracy Ward Jordan, Mocksville, NC (US)

(72) Inventor: Tracy Ward Jordan, Mocksville, NC (US)

( * ) Notice: Subject to any disclaimer, the term of this patent is extended or adjusted under 35 U.S.C. 154(b) by 345 days.

(21) Appl. No.: 17/839,636

(22) Filed: Jun. 14, 2022

(51) Int. Cl.
*B60R 16/023* (2006.01)
*B60R 16/02* (2006.01)

(52) U.S. Cl.
CPC ........ *B60R 16/023* (2013.01); *B60R 16/0207* (2013.01)

(58) Field of Classification Search
CPC .......................... B60R 16/023; B60R 16/0207
See application file for complete search history.

(56) References Cited

U.S. PATENT DOCUMENTS

| | | | |
|---|---|---|---|
| 7,224,083 B2 * | 5/2007 | Flick | B60R 25/20 307/10.6 |
| 9,908,488 B2 | 5/2018 | Shafer | |
| 10,462,225 B2 | 10/2019 | Chen | |
| 10,640,084 B1 | 5/2020 | Conners | |
| 2012/0029852 A1 | 2/2012 | Goff | |
| 2015/0001870 A1 | 1/2015 | Parcher | |
| 2019/0135230 A1 * | 5/2019 | Garner | B60R 25/042 |
| 2022/0382237 A1 * | 12/2022 | Cote | G05B 19/0423 |

FOREIGN PATENT DOCUMENTS

WO 2008083412 7/2008

* cited by examiner

*Primary Examiner* — Carlos Amaya
(74) *Attorney, Agent, or Firm* — Kyle A. Fletcher, Esq.

(57) ABSTRACT

The vehicle-tracking wiring harness comprises a wiring harness, and a control circuit. The vehicle-tracking wiring harness may be configured to work around a VECU of a vehicle or to work directly with a vehicle regardless of the presence of a VECU. The control circuit mounts in the wiring harness. The wiring harness electrically connects directly or indirectly to the VECU or to the vehicle's electronic control signal wiring. The control circuit mounts in the wiring harness. The control circuit monitors the GPS location of the vehicle. In the first potential embodiment of the disclosure, the vehicle-tracking wiring harness remotely controls: a) the fuel pump of the vehicle; and/or b) the ignition of the vehicle; and/or, c) the audible and visual signaling devices of the vehicle.

20 Claims, 6 Drawing Sheets

VEHICLE-TRACKING WIRING HARNESS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of electric circuits specially adapted for vehicles. (B60R16/00)

Summary of Invention

The vehicle-tracking wiring harness comprises a wiring harness, and a control circuit. The vehicle-tracking wiring harness may be configured to work around a VECU of a vehicle or to work directly with a vehicle regardless of the presence of a VECU. The control circuit mounts in the wiring harness. The wiring harness electrically connects directly or indirectly to the VECU or to the vehicle's electronic control signal wiring. The control circuit mounts in the wiring harness. The wiring harness electrically connects through current factory connectors or flying leads such that the installation of the vehicle-tracking wiring harness may or may not require splicing cables. The control circuit remotely controls the operation of selected function regardless of the VECU. The control circuit monitors the GPS location of the vehicle. In the first potential embodiment of the disclosure, the vehicle-tracking wiring harness remotely controls: a) the fuel pump of the vehicle; b) the ignition of the vehicle; and, c) the audible and visual signaling devices of the vehicle.

These together with additional objects, features and advantages of the vehicle-tracking wiring harness will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle-tracking wiring harness in detail, it is to be understood that the vehicle-tracking wiring harness is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle-tracking wiring harness.

It is therefore important that the claims be regarded as including such equivalent construction insofar as they do not depart from the spirit and scope of the vehicle-tracking wiring harness. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
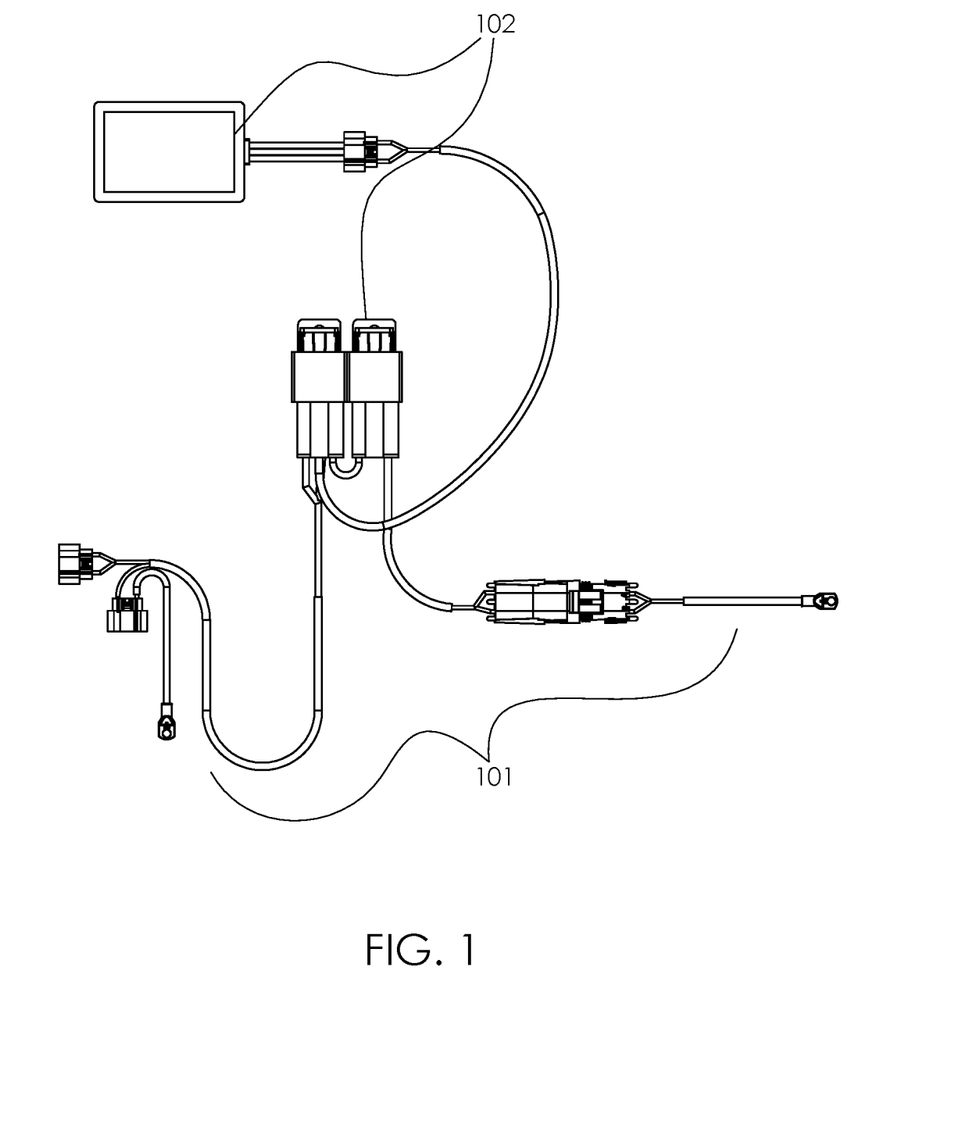
FIG. 1 is a front view of an embodiment of the disclosure.
Figure 2:
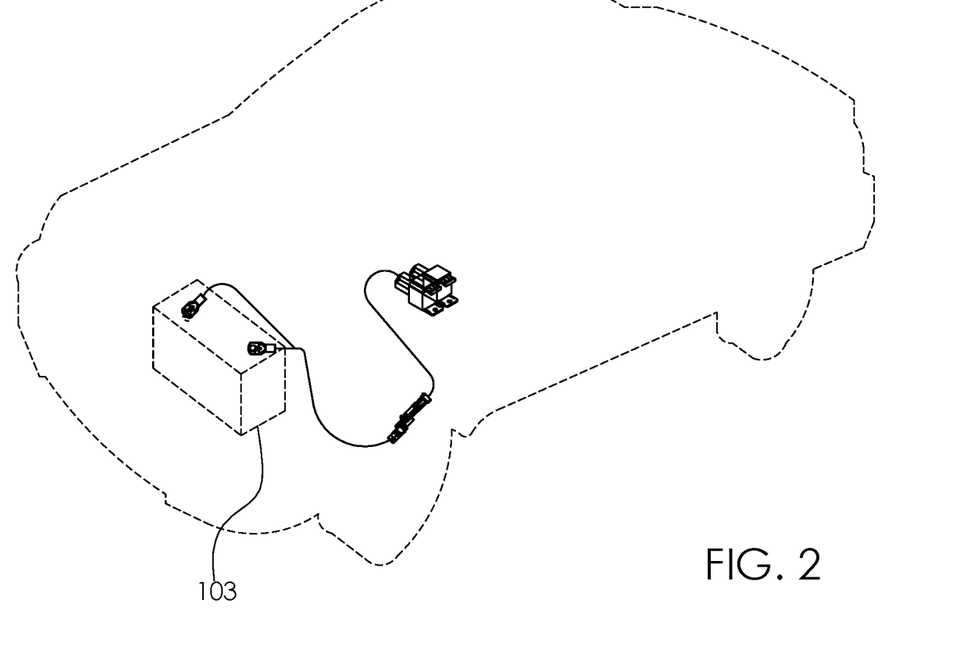
FIG. 2 is a perspective view of an embodiment of the disclosure.
Figure 3:
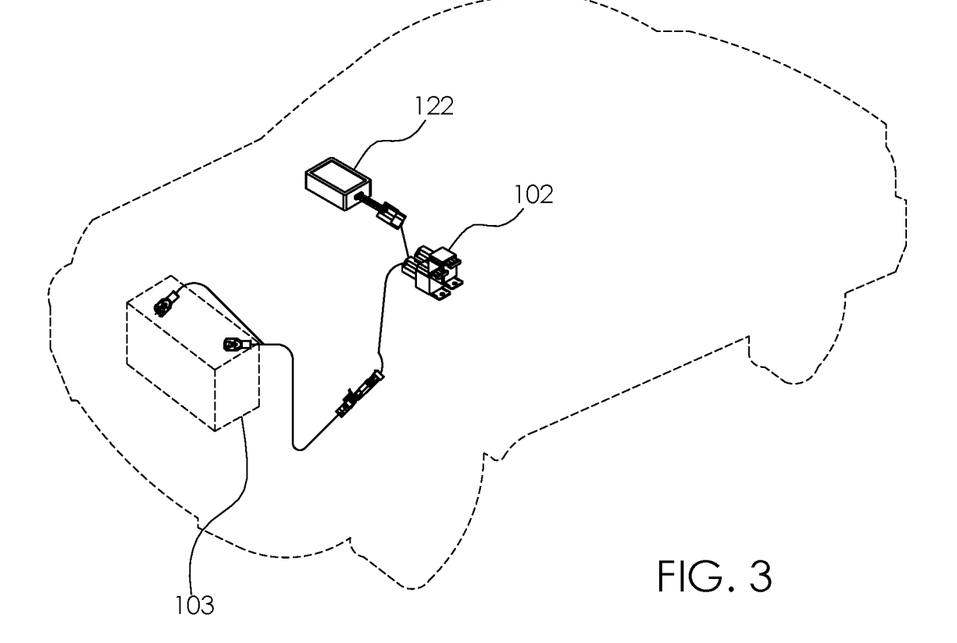
FIG. 3 is a perspective view of an embodiment of the disclosure.
Figure 4:
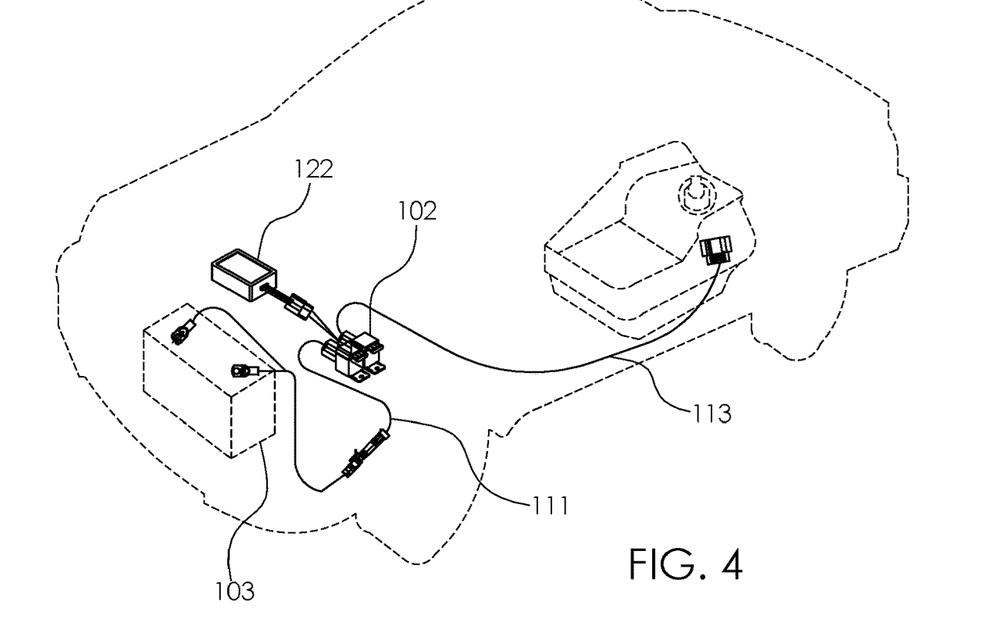
FIG. 4 is a perspective view of an embodiment of the disclosure.
Figure 5:
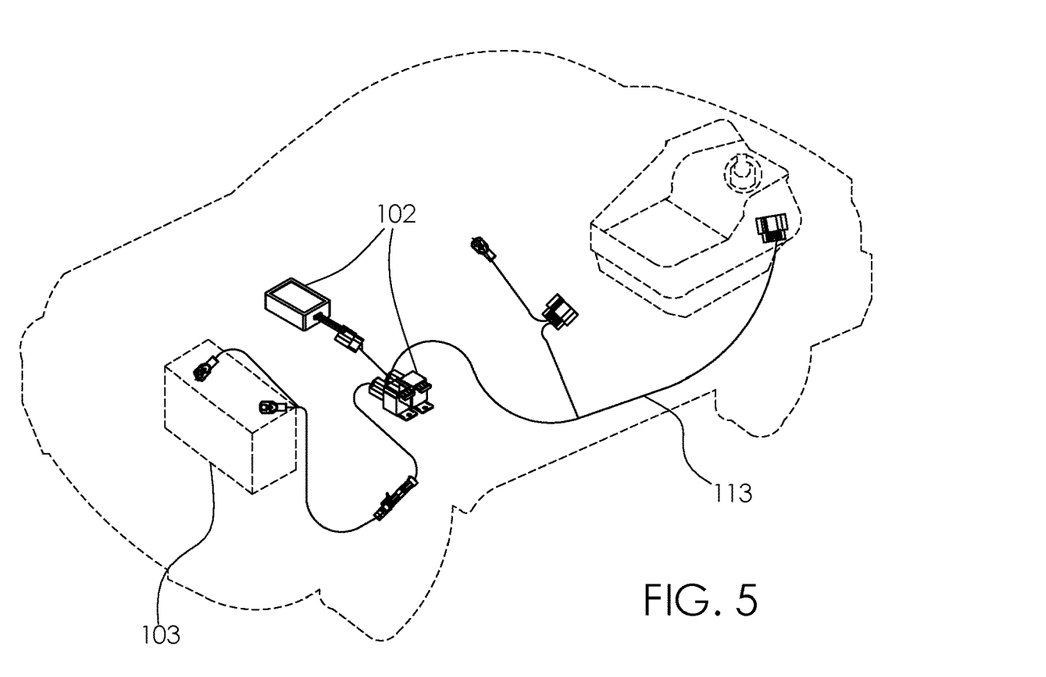
FIG. 5 is a perspective view of an embodiment of the disclosure.
Figure 6:
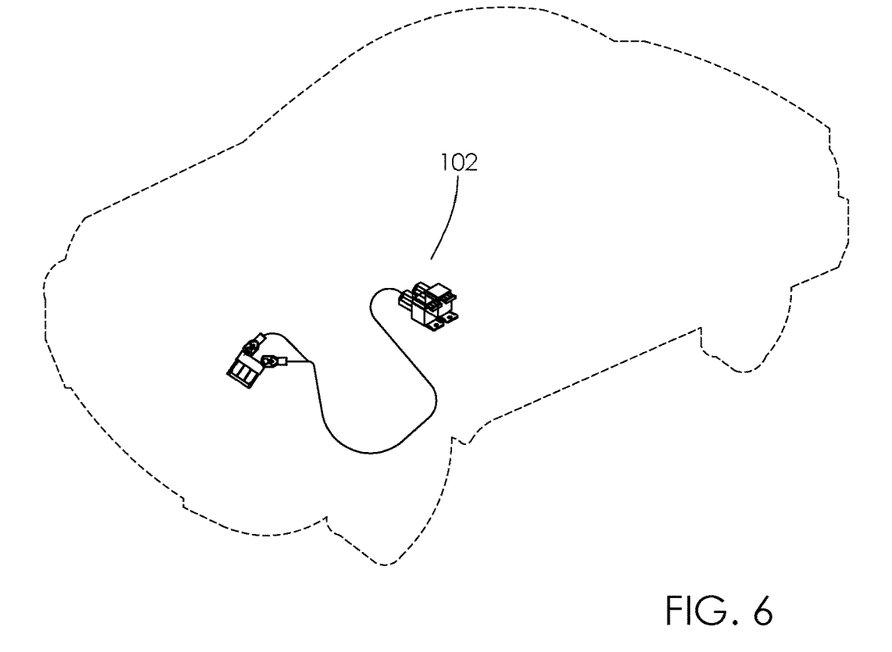
FIG. 6 is a perspective view of an embodiment of the disclosure.
Figure 7:
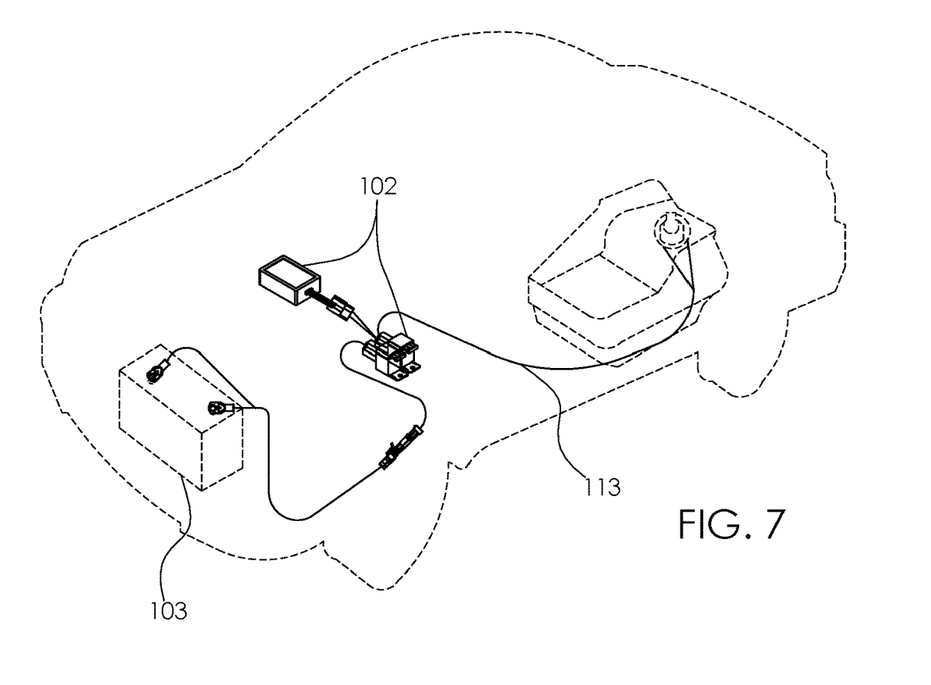
FIG. 7 is a perspective view of an embodiment of the disclosure.
Figure 8:
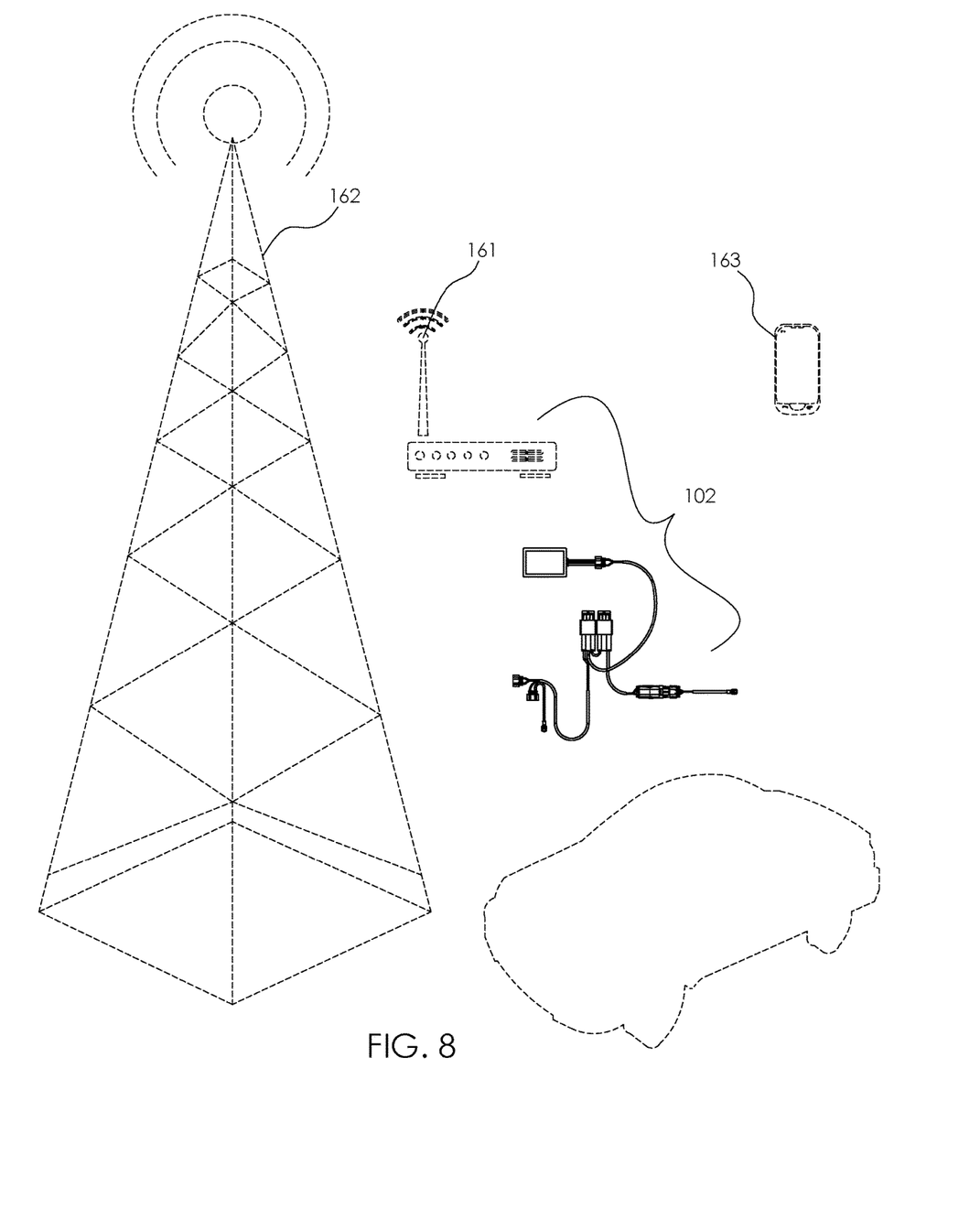
FIG. 8 is an in-use view of an embodiment of the disclosure.
Figure 9:
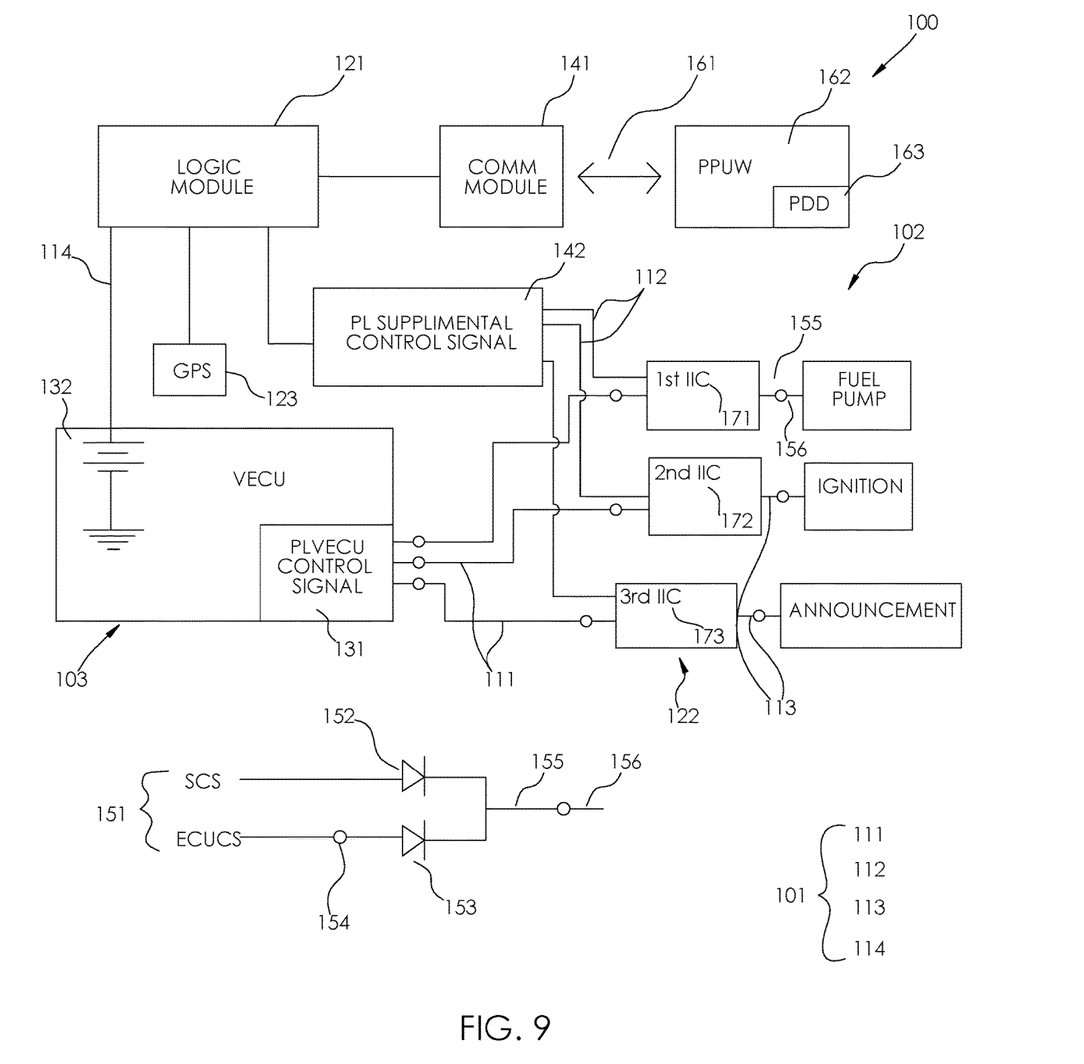
FIG. 9 is a schematic view of an embodiment of the disclosure.

Detailed reference will now be made to one or more potential embodiments of the disclosure, which are illustrated in FIGS. 1 through 9.

The following abbreviations are used in this disclosure:

IC: Intercept Circuit
IIC: Individual Intercept Circuit
PPD: Personal Data Device
PPWN: Commercially Provided and Publicly Available Cellular Wireless Network
SCS: Supplemental Control Signal
VECU: Vehicle Engine Control Unit
VECUCS: VECU Control Signal The vehicle-tracking wiring harness 100 (hereinafter invention) comprises a wiring harness 101, a control circuit 102, and a VECU 103. The control circuit 102 mounts in the wiring harness 101. The wiring harness 101 electrically connects to the VECU 103 or individual electrical systems. The VECU 103 is provisioned with a vehicle. The control circuit 102 mounts in the wiring harness 101. The wiring harness 101 electrically connects into the VECU 103 or other electrical systems through current factory connectors or flying leads that require splicing such that the installation of the invention 100 may or may not require splicing cables within the VECU 103 or other electrical systems of the vehicle. The control circuit 102 remotely controls the operation of selected function within the VECU 103 or other electrical systems of the vehicle.

The control circuit 102 monitors the GPS location of the vehicle. In the first potential embodiment of the disclosure, the invention 100 remotely controls: a) the fuel pump of the vehicle; and/or b) the ignition of the vehicle; and/or, c) the audible and visual signaling devices of the vehicle.

The VECU 103 is an electric circuit that powers various systems in a vehicle. The VECU 103 is the electric system of the vehicle. The VECU 103 or vehicle electric control signals controls the operation of all electrically powered devices in the vehicle. The VECU 103 is defined elsewhere in this disclosure. It shall be noted that the invention 100 is capable of being installed in vehicles that have a VECU 103 as well as vehicles that do not have a VECU 103. Moreover, vehicles that do not have a VECU 103 still use electrical control signals to turn on or off different electrical devices in the vehicle, such as a fuel pump or an ignition. So for purposes of this specification, the electrical signals are being used for both scenarios.

The VECU 103 comprises a plurality of VECU 103 control signals 131 and an electric power system 132. The plurality of VECU 103 control signals 131 or vehicle electric signals 131 control the operation of the electrically powered device(s) in the vehicle. The electric power system 132 provides the electric energy required to operate the electrically powered device(s) in the vehicle.

The plurality of VECU 103 control signals 131 comprises a collection of electric control signals generated by the VECU 103. Each VECU 103 control signal selected from the plurality of VECU 103 control signals 131 controls the operation of an electrically powered device in the vehicle. Each VECU 103 control signal selected from the plurality of VECU 103 control signals 131 controls an electrically powered device in the vehicle that is controlled by both the VECU 103 and the control circuit 102 that is further electrically connected to an individual intercept circuit 151 selected from the plurality of intercept circuits 122.

The control circuit 102 is an electric circuit. The control circuit 102 is incorporated into the wiring harness 101. The control circuit 102 remotely controls the electrically powered devices in the vehicle that are controlled by both the VECU 103 and the control circuit 102. The control circuit 102 receives a plurality of VECU 103 control signals 131. The plurality of VECU 103 control signals 131 electrically control the electrically powered devices in the vehicle that are controlled by both the VECU 103 and the control circuit 102. The control circuit 102 retransmits the plurality of VECU 103 control signals 131 to the electrically powered devices in the vehicle that are controlled by both the VECU 103 and the control circuit 102. The control circuit 102 comprises a logic module 121, a plurality of intercept circuits 122, and a GPS module 123. The logic module 121, the plurality of intercept circuits 122, and the GPS module 123 are electrically interconnected.

The logic module 121 is a readily and commercially available programmable electronic device that is used to manage, regulate, and operate the control circuit 102. The communication module 141 is a wireless electronic communication device that allows the logic module 121 to wirelessly communicate with a personal data device 163. Specifically, the communication module 141 establishes a wireless communication link 161 between the control circuit 102 and the personal data device 163 through a commercially provided and publicly available cellular wireless network 162. Both the logic control module and the communication module are available as one commercially available tracking device to simplify use and production. These tracking devices provide both logic control to devices in the vehicle as well as communication through a cellular wireless network 162.

The communication module 141 further comprises a wireless communication link 161 and a personal data device 163. The personal data device 163 is a programmable electrical device. The personal data device 163 further comprises an application. The personal data device 163 provides data management and communication services through one or more functions referred to as an application. The application is a set of logical operating instructions that are performed by the personal data device 163. The application of the personal data device 163 forms an interface between the control circuit 102 and the personal data device 163 that allows the personal data device to remotely control the operation of the electrically powered devices in the vehicle that that are controlled by both the VECU 103 and the control circuit 102.

The GPS module 123 is an electrical device that communicates with the GPS to determine the GPS coordinates of the GPS module 123. When queried by the logic module 121, the GPS module 123 transfers the GPS coordinates to the logic module 121. The logic module 121 transmits the GPS coordinates to the personal data device 163.

The logic module 121 is an electric circuit. The logic module 121 remotely controls the operation of the electrically powered devices in the vehicle that are controlled by both the VECU 103 and the control circuit 102. The logic module 121 receives the operating instructions for the remote control of each controlled electric device from the personal data device 163. The logic module 121 transmits the received operating instructions to an electric device through an individual intercept circuit 151 selected from the plurality of intercept circuits 122. The logic module 121 electrically connects to the plurality of intercept circuits 122. The logic module 121 further comprises a communication module 141 and a plurality of supplemental control signals 142.

The plurality of supplemental control signals 142 comprises a collection of electric control signals generated by the logic module 121. Each supplemental control signal selected from the plurality of supplemental control signals 142 electrically 11 connects to an individual intercept circuit 151 selected from the plurality of intercept circuits 122.

The plurality of intercept circuits 122 comprises a collection of individual intercept circuits 151. Each individual intercept circuit 151 selected from the plurality of intercept circuits 122 is an electric circuit. Each individual intercept circuit 151 selected from the plurality of intercept circuits 122 receives a control signal from the plurality of VECU 103 control signals 131 for an electrically powered devices in the vehicle that are controlled by both the VECU 103 and the control circuit 102. The selected individual intercept circuit 151 further receives a control signal selected from the plurality of supplemental control signals 142 for the same electrical device. The selected individual intercept circuit 151 merges the two received control signals such that the operation of the shared electric device can be operated by either the plurality of VECU 103 control signals 131 or the plurality of supplemental control signals 142. The individual intercept circuit 151 selected from the plurality of intercept circuits 122 is identical.

Each individual intercept circuit 151 comprises a SCS relay 152, a VECUCS relay 153, a VECUCS input plug 154, an IIC control signal 155 and an IIC output plug 156.

The SCS relay 152 electrically connects to a supplemental control signal selected from the plurality of supplemental control signals 142. The SCS relay 152 receives the supplemental control signal selected from the plurality of supplemental control signals 142. The SCS relay 152 transmits the received supplemental control signal to the IIC control signal 155. The SCS relay 152 is an electric device that limits the flow of electricity to a single direction. The SCS relay 152 allows the flow of electricity from the plurality of supplemental control signals 142 to the IIC control signal 155. The SCS relay 152 prevents the back flow of electricity from the IIC control signal 155 into the plurality of supplemental control signals 142.

The VECUCS relay 153 is a relay. The VECUCS relay 153 electrically connects to a VECU 103 control signal selected from the electric power system 132. The VECUCS relay 153 receives the VECU 103 control signal selected from the electric power system 132. The VECUCS relay 153 transmits the received VECU 103 control signal to the IIC control signal 155. The VECUCS relay 153 is an electric device that limits the flow of electricity to a single direction. The VECUCS relay 153 allows the flow of electricity from the electric power system 132 to the IIC control signal 155. The VECUCS relay 153 prevents the back flow of electricity from the IIC control signal 155 into the electric power system 132.

The VECUCS input plug 154 is a plug. The VECUCS input plug 154 forms a termination for a VECUCS cable selected from the plurality of VECUCS cables 111. The selected VECUCS cable removably attaches to the VECUCS input plug 154. The selected VECUCS cable forms an electric connection with the VECUCS input plug 154 that transmits a control signal selected from the electric power system 132 to the VECUCS input plug 154. The VECUCS input plug 154 forms an electric connection with the VECUCS relay 153. The VECUCS input plug 154 transmits the received control signal to the VECUCS relay 153.

The IIC control signal 155 simultaneously forms an electric connection between: a) the SCS relay 152 and the IIC output plug 156; and, b) and the VECUCS relay 153 and the IIC output plug 156. The IIC control signal 155 transmits a control signal to the IIC output plug 156 when a logical condition is true. The logical condition is selected from the group consisting of: a) the SCS relay 152 is receiving a control signal from the plurality of supplemental control signals 142; and, b) the VECUCS relay 153 is receiving a control signal from the plurality of VECU 103 control signals 131.

The IIC output plug 156 is an electrical termination. The IIC output plug 156 forms a detachable connection with an electrically powered device in the vehicle that is controlled by both the VECU 103 and the control circuit 102.

The plurality of intercept circuits 122 further comprises a first individual interrupt circuit 171, a second individual interrupt circuit 172, and a third individual interrupt circuit 173.

The first individual interrupt circuit 171 forms an electric circuit that is used by the control circuit 102 and the VECU 103 to cut off the operation of the fuel pump of the vehicle. The first individual interrupt circuit 171 allows the control circuit 102 to disable the vehicle.

The second individual interrupt circuit 172 forms an electric circuit that is used by the control circuit 102 to disable the operation of the ignition of the vehicle.

The third individual interrupt circuit 173 forms an electric circuit that is used by the control circuit 102 and the VECU 103 to disable the operation of the ignition of the vehicle. The third individual interrupt circuit 173 allows the control circuit 102 to remotely control the audible and visual signaling devices of the vehicle. The third individual interrupt circuit 173 is used to help identify the specific location of the vehicle and to deter theft.

The wiring harness 101 is a cable harness. The cable harness is defined elsewhere in this disclosure. The wiring harness 101 forms a plurality of electric connections between the fuel pump, the ignition, and/or the VECU 103 and the control circuit 102. The wiring harness 101 further forms a plurality of electric connections between the control circuit 102 and the electrically powered devices in the vehicle that are controlled by both the VECU 103 and the control circuit 102.

The wiring harness 101 comprises a plurality of VECUCS cables 111, a plurality of SCS cables 112, a plurality of IC output cables 113, and a device power cable 114. The plurality of VECUCS cables 111 electrically connect the control circuit 102 to the plurality of VECU 103 control signals 131. The plurality of IC output cables 113 electrically connect the control circuit 102 to the electrically powered devices in the vehicle. The plurality of SCS cables 112 forms a portion of the internal wiring of the control circuit 102. Specifically, the plurality of SCS cables 112 electrically connect the logic module 121 to the plurality of intercept circuits 122. The device power cable 114 is an electrical connection between the electric power system 132 (battery, alternator, fuse box, VECU, or other power source from the vehicle) and the control circuit 102. The device power cable 114 transmits from the electrical power system 132.

Each cable selected from the plurality of VECUCS cables 111 forms an electric connection between the plurality of VECU 103 control signals 131 of the VECU 103 and an individual intercept circuit 151 selected from the plurality of intercept circuits 122. Each cable selected from the plurality of VECUCS cables 13 transmits a control signal selected from the plurality of VECU 103 control signals 131 to the appropriate individual intercept circuit 151 selected from the plurality of intercept circuits 122. Each cable selected from the plurality of VECUCS cables 111 plugs directly into the VECUCS input plug 154 of the associated individual intercept circuit 151.

Each cable selected from the plurality of SCS cables 112 forms an electric connection between the plurality of supplemental control signals 142 of the logic module 121 and an individual intercept circuit 151 selected from the plurality of intercept circuits 122. Each cable selected from the plurality of SCS cables 112 transmits a control signal selected from the plurality of supplemental control signals 142 to the appropriate individual intercept circuit 151 selected from the plurality of intercept circuits 122.

Each cable selected from the plurality of IC output cables 113 forms an electric connection between the plurality of intercept circuits 122 and the plurality of supplemental control signals 142 of the logic module 121. Each cable selected from the plurality of IC output cables 113 transmits a control signal selected from the plurality of VECU 103 control signals 131 to the appropriate individual intercept circuit 151 selected from the plurality of intercept circuits 122.

The device power cable 114 forms an electric connection between the electric power system 132 (the battery, fuse box, alternator, VECU, or alternative power from vehicle) and the logic module 121 of the plurality of supplemental control signals 142. The device power cable 114 transmits electric energy from the electric power system 132 to the logic module 121. The device power cable 114 provides the logic module 121 with the electric energy necessary to operate the control circuit 102. The device power 114 cable also provides power to the controlled vehicle system such as but not limited to fuel pump, ignition, audible and visual signaling devices, or other systems.

The following definitions were used in this disclosure:

Application or App: As used in this disclosure, an application or app is a self-contained piece of software that is especially designed or downloaded for use with a personal data device.

Appropriate Authority: As used in this disclosure, an appropriate authority is a previously determined person or organization that is designated to send and receive alarm or other notification messages regarding a monitored system or activity.

Bluetooth™: As used in this disclosure, Bluetooth™ is a standardized communication protocol that is used to wirelessly interconnect electronic devices.

Cable: As used in this disclosure, a cable is a collection of one or more insulated wires covered by a protective casing that is used for transmitting electricity or telecommunication signals.

Cable Harness: As used in this disclosure, a cable harness refers to an electromechanical structure comprising a harness structure and a plurality of cables. The cable harness is used as a component that mounts within a larger structure. The plurality of cables mount on the harness structure such that position of any first cable selected from the plurality of cables remains roughly fixed relative to the position of any second cable selected from the plurality of cables. By roughly fixed is meant that terminating ends of each of cable selected from the plurality of cables can move freely relative to the harness structure. This freedom of movement ensures that each of the plurality of cables can be used to form an electrical connection within the larger structure. The terms wire harness and wiring harness are synonyms for cable harness.

Commercially Provided and Publicly Available Cellular Wireless Network: As used in this disclosure, a commercially provided and publicly available cellular wireless network refers to subscription based publicly available wireless network commonly used to provide wireless communication access for personal data devices. The commercially provided and publicly available cellular wireless network will typically provide voice communication, data communication services, and SMS and MMS messaging services. The commercially provided and publicly available cellular wireless network is commonly referred to as the cellular network. The commercially provided and publicly available cellular wireless network is abbreviated as the PPWN.

Communication Link: As used in this disclosure, a communication link refers to the structured exchange of data between two objects.

Fuel: As used in this disclosure, fuel refers to a substance that undergoes a chemical combustion reaction to release chemical potential energy.

GPS: As used in this disclosure, and depending on the context, GPS refers to: a) a system of navigational satellites that are used to determine the position, known as GPS coordinates, and velocity of a person or object; b) the system of navigational satellites referred to in the first definition that are used to synchronize to global time; or, c) an electronic device or that uses the system of navigational satellites referred to in the first definition to determine the position of a person or object. GPS is an acronym for Global Positioning System. GPS may also be cell-phone based, and not reliant on Satellites. Methods to determine the distance and direction between any two sets of GPS coordinates are well-known and documented in the navigational arts.

Hand Tool: As used in this disclosure, a hand tool refers to a tool that is small and light enough to allow a person to hold the tool during use.

Hardwired: As used in this disclosure, the term hardwired refers to a physical electrical connection, generally using cable, between two electrical circuits or circuit elements. Such a hardwired connection is considered more reliable than a wireless connection.

Lead: As used in this disclosure, a lead is a conductor that is physically used to electrically connect an electrical component into a larger circuit assembly.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable. Additionally, the logic module can be combined with the communication module in a commercially available tracker device.

PDD: As used in this disclosure, PDD is an acronym for personal data device.

Personal Data Device: As used in this disclosure, a personal data device is a handheld logical device that is used for managing personal information and communication. Examples of personal data device include, but are not limited to, cellular phones, tablets, and smartphones.

Plug: As used in this disclosure, a plug is an electrical termination that electrically connects a first electrical circuit to a second electrical circuit or a source of electricity. As used in this disclosure, a plug will have one or more metal pins.

Port: As used in this disclosure, a port is an electrical termination that is used to connect a first electrical circuit to a second external electrical circuit. In this disclosure, the port is designed to receive a plug.

PPWN: As used in this disclosure, the PPWN is an acronym for publicly provided wireless network. The PPWN refers to a commercially provided and publicly available cellular wireless network.

Pump: As used in this disclosure, a pump is a mechanical device that uses suction or pressure to raise or move fluids, compress fluids, or force a fluid into an inflatable object. Within this disclosure, a compressor refers to a pump that is dedicated to compressing a fluid or placing a fluid under pressure.

Relay: As used in this disclosure, a relay is an automatic electronic, electromagnetic, or electromechanical device that reacts to changes in voltage or current by opening or closing a switch in an electric circuit. Relays are further defined with a coil and a switch. Applying a voltage to the coil, usually referred to as energizing the coil, will cause the coil to change the position of the switch. This definition is not intended to preclude the substitution of a transistor for a relay. Within this disclosure, a transistor can be considered as a relay. In this scenario, the base voltage is analogous to the coil of the relay and the current flow from the collector to the emitter is analogous to the operation of the switch of the relay. Those skilled in the electrical arts will recognize that this substitution can be made without undue experimentation. The transistor is defined in greater detail elsewhere in this disclosure.

SMS: As used in this disclosure, SMS is an abbreviation for short message service. The short message service is a service that is often provided with the cellular services that support personal data devices. Specifically, the SMS allows for the exchange of written messages between personal data devices. The SMS is commonly referred to as text messaging. A common enhancement of SMS is the inclusion of the delivery of multimedia services. This enhanced service is often referred to as Multimedia Media Services which is abbreviated as MMS.

Subscription: As used in this disclosure, a subscription refers to a contractual arrangement for the delivery of a product or access to a service on a recurring basis. The subscribed product or service can be provided on a continuous basis or on a scheduled basis. The term subscription often implies that the subscribed product or service has been paid for in advance.

Terminal: As used in this disclosure, a terminal is the end point of a conductor. A terminal can be the conducting wire itself or may have attached to is a device designed to facilitate an electrical connection. The terminal is also called a termination.

Termination: As used in this disclosure, a termination is an electrical device that electrically connects to the end of an electric circuit path.

Tool: As used in this disclosure, a tool is a device, an apparatus, or an instrument that is used to carry out an activity, operation, or procedure. A tool generally comprises a working element and a handle.

Transistor: As used in this disclosure, a transistor is a general term for a three terminal semiconducting electrical device that is used for electrical signal amplification and electrical switching applications. There are several designs of transistors. A common example of a transistor is an NPN transistor that further comprises a collector terminal, an emitter terminal, and a base terminal and which consists of a combination of two rectifying junctions (a relay is an example of a rectifying junction). Current flowing from the collector terminal through the emitter terminal crosses the two rectifier junctions. The amount of the electric current crossing the two rectified junctions is controlled by the amount of electric current that flows through the base terminal. This disclosure assumes the use of an NPN transistor. This assumption is made solely for the purposes of simplicity and clarity of exposition. Those skilled in the electrical arts will recognize that other types of transistors, including but not limited to, field effect transistors and PNP transistors, can be substituted for an NPN transistor without undue experimentation.

VECU: As used in this disclosure, the VECU is an acronym for the Vehicle Engine Control Unit of the vehicle. The VECU is an electronic device that controls the operation of all electrical subsystems within a vehicle. Additionally, the wiring harness may be wired/connected to the vehicle wiring bypassing the VECU OR be used in vehicles where a VECU is not present and the wiring harness is wired/connected to the vehicle's electrical system.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor. A motorized vehicle further comprises an electrical system that can be used as a source of electric energy. The enclosed passenger space of a vehicle is known as a cab.

WiFi™: As used in this disclosure, WiFi™ refers to the physical implementation of a collection of wireless electronic communication standards commonly referred to as IEEE 802.11x.

Wire: As used in this disclosure, a wire is a structure with the general appearance of a cord or strand that is formed from an electrically conductive metal.

Wireless: As used in this disclosure, wireless is an adjective that is used to describe a communication link between two devices that does not require the use of physical cabling.

Wireless Communication Establishment Technology: As used in this disclosure, a wireless communication establishment technology refers to technology that establishes a wireless communication link between a first logical device and a second logical device. Usually, the operation of a wireless communication establishment technology is initiated by the push of a button. An example of such a technology is the WiFi™ protected setup technology (WPS™).

Working Element: As used in this disclosure, the working element of a tool is the physical element on the tool that performs the actual activity, operation, or procedure the tool is designed to perform. For example, the cutting edge of a blade is the working element of a knife.

With respect to the above description, it is to be realized that the optimum dimensional relationship for the various components of the invention described above and in FIGS. 1 through 9 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A wiring harness for disabling a vehicle comprising a control circuit;
wherein the control circuit mounts in the wiring harness;
wherein the wiring harness is configured to electrically connect to a vehicle in order to disable said vehicle;
wherein the control circuit is configured to monitor a GPS location of the vehicle;
wherein the control circuit is configured to remotely control electrically powered devices in the vehicle;
wherein the wiring harness comprises a plurality of SCS cables, a plurality of IC output cables, and a device power cable;
wherein the plurality of IC output cables are configured to electrically connect the control circuit to the electrically powered devices in the vehicle;

wherein the plurality of SCS cables electrically connect a logic module to a plurality of intercept circuits;
wherein the device power cable is configured to be an electrical connection between an electric power system of the vehicle and the control circuit.

2. The wiring harness according to claim 1
wherein the wiring harness is configured to remotely control: a) a fuel pump of the vehicle; b) and/or an ignition of the vehicle; and/or, c) an audible and visual signaling device of the vehicle.

3. The wiring harness according to claim 2
wherein the control circuit is an electric circuit;
wherein the control circuit is incorporated into the wiring harness;
wherein the control circuit is configured to retransmit a plurality of control signals to the electrically powered devices in the vehicle.

4. The wiring harness according to claim 3
wherein the wiring harness is a cable harness;
wherein the wiring harness is configured to further form a plurality of electric connections between the control circuit and the electrically powered devices in the vehicle.

5. The wiring harness according to claim 4
wherein the control circuit comprises the logic module, the plurality of intercept circuits, and the GPS module;
wherein the logic module, the plurality of intercept circuits, and the GPS module are electrically interconnected;
wherein the logic module further comprises a communication module and a plurality of supplemental control signals;
wherein the plurality of supplemental control signals comprises a collection of electric control signals generated by the logic module.

6. The wiring harness according to claim 5
wherein the logic module is a programmable electronic device;
wherein the communication module is a wireless electronic communication device;
wherein the communication module further comprises a wireless communication link and a personal data device;
wherein the personal data device is a programmable electrical device;
wherein the communication module establishes a wireless communication link between the control circuit and the personal data device through a commercially provided and publicly available cellular wireless network;
wherein the GPS module is an electrical device that communicates with the GPS to determine the GPS coordinates of the GPS module;
wherein when queried by the logic module, the GPS module transfers the GPS coordinates to the logic module;
wherein the logic module transmits the GPS coordinates to the personal data device.

7. The VECU compatible wiring harness according to claim 6
wherein the logic module electrically connects to the plurality of intercept circuits;
wherein the logic module is configured to remotely control the operation of the electrically powered devices in the vehicle;
wherein the logic module receives the operating instructions for the remote control of each controlled electric device from the personal data device through the plurality of intercept circuits;
wherein the logic module transmits the received operating instructions to an electric device through an individual intercept circuit selected from the plurality of intercept circuits;
wherein each supplemental control signal selected from the plurality of supplemental control signals electrically connects to an individual intercept circuit selected from the plurality of intercept circuits.

8. The wiring harness according to claim 7
wherein each individual intercept circuit selected from the plurality of intercept circuits is an electric circuit;
wherein each individual intercept circuit selected from the plurality of intercept circuits is configured to receive a control signal for an electrically powered devices in the vehicle;
wherein the selected individual intercept circuit further is configured to receive a control signal selected from the plurality of supplemental control signals for the same electrical device;
wherein the individual intercept circuit selected from the plurality of intercept circuits is identical.

9. A VECU compatible wiring harness comprising
a wiring harness, a control circuit;
wherein the control circuit mounts in the wiring harness;
wherein the wiring harness is configured to electrically connect to a vehicle;
wherein the control circuit mounts in the wiring harness;
wherein the control circuit is configured to remotely control electrically powered devices in the vehicle that are controlled by both a vehicle engine control unit (VECU) of the vehicle and the control circuit;
wherein the control circuit is configured to retransmit a plurality of VECU control signals to the electrically powered devices in the vehicle that are controlled by both the VECU and the control circuit;
wherein the wiring harness comprises a plurality of VECUCS cables, a plurality of SCS cables, a plurality of IC output cables, and a device power cable;
wherein the plurality of VECUCS cables electrically connect the control circuit to the plurality of VECU control signals;
wherein the plurality of IC output cables are configured to electrically connect the control circuit to the electrically powered devices in the vehicle;
wherein the plurality of SCS cables electrically connect a logic module to a plurality of intercept circuits;
wherein the device power cable is configured to be an electrical connection between an electric power system of the VECU and the control circuit.

10. The VECU compatible wiring harness according to claim 9
wherein the control circuit is configured to monitor a GPS location of the vehicle;
wherein the wiring harness is configured to remotely control: a) a fuel pump of the vehicle; b) an ignition of the vehicle; and, c) an audible and visual signaling device of the vehicle.

11. The VECU compatible wiring harness according to claim 10
wherein the control circuit is an electric circuit;
wherein the control circuit is incorporated into the wiring harness.

12. The VECU compatible wiring harness according to claim 11
   wherein the wiring harness is a cable harness;
   wherein the wiring harness is configured to form a plurality of electric connections between the VECU and the control circuit;
   wherein the wiring harness is configured to further form a plurality of electric connections between the control circuit and the electrically powered devices in the vehicle that are controlled by both the VECU and the control circuit.

13. The VECU compatible wiring harness according to claim 12
   wherein the control circuit comprises the logic module, the plurality of intercept circuits, and the GPS module;
   wherein the logic module, the plurality of intercept circuits, and the GPS module are electrically interconnected;
   wherein the logic module further comprises a communication module and a plurality of supplemental control signals;
   wherein the plurality of supplemental control signals comprises a collection of electric control signals generated by the logic module.

14. The VECU compatible wiring harness according to claim 13
   wherein the logic module is a programmable electronic device;
   wherein the communication module is a wireless electronic communication device;
   wherein the communication module further comprises a wireless communication link and a personal data device;
   wherein the personal data device is a programmable electrical device;
   wherein the communication module establishes a wireless communication link between the control circuit and the personal data device through a commercially provided and publicly available cellular wireless network;
   wherein the GPS module is an electrical device that communicates with the GPS to determine the GPS coordinates of the GPS module;
   wherein when queried by the logic module, the GPS module transfers the GPS coordinates to the logic module;
   wherein the logic module transmits the GPS coordinates to the personal data device.

15. The VECU compatible wiring harness according to claim 14
   wherein the logic module electrically connects to the plurality of intercept circuits;
   wherein the logic module is configured to remotely control the operation of the electrically powered devices in the vehicle that are controlled by both the VECU and the control circuit;
   wherein the logic module receives the operating instructions for the remote control of each controlled electric device from the personal data device through the plurality of intercept circuits;
   wherein the logic module transmits the received operating instructions to an electric device through an individual intercept circuit selected from the plurality of intercept circuits;
   wherein each supplemental control signal selected from the plurality of supplemental control signals electrically connects to an individual intercept circuit selected from the plurality of intercept circuits.

16. The VECU compatible wiring harness according to claim 15
   wherein each individual intercept circuit selected from the plurality of intercept circuits is an electric circuit;
   wherein each individual intercept circuit selected from the plurality of intercept circuits is configured to receive a control signal from the plurality of VECU control signals for an electrically powered devices in the vehicle that are controlled by both the VECU and the control circuit;
   wherein the selected individual intercept circuit further is configured to receive a control signal selected from the plurality of supplemental control signals for the same electrical device;
   wherein the selected individual intercept circuit is configured to merge the two received control signals such that the operation of the shared electric device can be operated by either the plurality of VECU control signals or the plurality of supplemental control signals;
   wherein the individual intercept circuit selected from the plurality of intercept circuits is identical.

17. The VECU compatible wiring harness according to claim 16
   wherein each individual intercept circuit comprises a SCS relay, a VECUCS relay, a VECUCS input plug, an IIC control signal and an IIC output plug;
   wherein the SCS relay is a relay;
   wherein the SCS relay electrically is configured to connect to a supplemental control signal selected from the plurality of supplemental control signals;
   wherein the SCS relay is configured to receive the supplemental control signal selected from the plurality of supplemental control signals;
   wherein the SCS relay transmits the received supplemental control signal to the IIC control signal;
   wherein the SCS relay is an electric device that limits the flow of electricity to a single direction;
   wherein the SCS relay allows the flow of electricity from the plurality of supplemental control signals to the IIC control signal;
   wherein the SCS relay prevents the back flow of electricity from the IIC control signal into the plurality of supplemental control signals;
   wherein a VECUCS relay is configured to electrically connect to a VECU control signal selected from the electric power system;
   wherein the VECUCS relay is configured to receive the VECU control signal selected from the electric power system;
   wherein the VECUCS relay is configured to transmit the received VECU control signal to the IIC control signal;
   wherein the VECUCS relay is an electric device that limits the flow of electricity to a single direction;
   wherein the VECUCS relay allows the flow of electricity from the electric power system to the IIC control signal;
   wherein the VECUCS relay prevents the back flow of electricity from the IIC control signal into the electric power system;
   wherein a VECUCS input plug is configured to form a termination for a VECUCS cable selected from the plurality of VECUCS cables;
   wherein the selected VECUCS cable is configured to removably attach to the VECUCS input plug;
   wherein the selected VECUCS cable is configured to form an electric connection with the VECUCS input plug that transmits a control signal selected from the electric power system to the VECUCS input plug;

wherein the VECUCS input plug forms an electric connection with the VECUCS relay;

wherein the VECUCS input plug transmits the received control signal to the VECUCS relay;

wherein the IIC control signal simultaneously forms an electric connection between: a) the SCS relay and the IIC output plug; and, b) and the VECUCS relay and the IIC output plug;

wherein the IIC control signal transmits a control signal to the IIC output plug when a logical condition is true;

wherein the logical condition is selected from the group consisting of: a) the SCS relay is receiving a control signal from the plurality of supplemental control signals; and, b) the VECUCS relay is receiving a control signal from the plurality of VECU control signals;

wherein the IIC output plug is an electrical termination;

wherein the IIC output plug forms a detachable connection with an electrically powered device in the vehicle that is controlled by both the VECU and the control circuit.

18. The VECU compatible wiring harness according to claim 17 wherein each cable selected from the plurality of VECUCS cables forms an electric connection between the plurality of VECU control signals of the VECU and an individual intercept circuit selected from the plurality of intercept circuits;

wherein each cable selected from the plurality of VECUCS cables transmits a control signal selected from the plurality of VECU control signals to the appropriate individual intercept circuit selected from the plurality of intercept circuits;

wherein each cable selected from the plurality of VECUCS cables plugs directly into the VECUCS input plug of the associated individual intercept circuit.

19. The VECU compatible wiring harness according to claim 18 wherein each cable selected from the plurality of SCS cables forms an electric connection between the plurality of supplemental control signals of the logic module and an individual intercept circuit selected from the plurality of intercept circuits;

wherein each cable selected from the plurality of SCS cables transmits a control signal selected from the plurality of supplemental control signals to the appropriate individual intercept circuit selected from the plurality of intercept circuits.

20. The VECU compatible wiring harness according to claim 19 wherein each cable selected from the plurality of IC output cables forms an electric connection between the plurality of intercept circuits and the plurality of supplemental control signals of the logic module;

wherein each cable selected from the plurality of IC output cables transmits a control signal selected from the plurality of VECU control signals to the appropriate individual intercept circuit selected from the plurality of intercept circuits.

\* \* \* \* \*